Nov. 24, 1970 J. M. COLLINGS 3,543,288

APPARATUS AND METHOD FOR PRODUCING A SQUARE-LAW FUNCTION

Filed May 27, 1968 4 Sheets-Sheet 1

INVENTOR.
JERRY M. COLLINGS

BY

*Warren, Rubin, Brucker & Chickering*
ATTORNEYS

INVENTOR.
JERRY M. COLLINGS
BY
Warren, Rubin,
Brucker & Chickering
ATTORNEYS

APPARATUS AND METHOD FOR PRODUCING A SQUARE-LAW FUNCTION

Filed May 27, 1968

INVENTOR.
JERRY M. COLLINGS
BY
*Warren, Rubin, Brucker & Chickering*
ATTORNEYS

Nov. 24, 1970 J. M. COLLINGS 3,543,288

APPARATUS AND METHOD FOR PRODUCING A SQUARE-LAW FUNCTION

Filed May 27, 1968 4 Sheets-Sheet 4

INVENTOR.
JERRY M. COLLINGS

BY *Warren, Rubin, Brucker & Chickering*

ATTORNEYS

United States Patent Office 3,543,288

Patented Nov. 24, 1970

3,543,288

APPARATUS AND METHOD FOR PRODUCING A SQUARE-LAW FUNCTION

Jerry M. Collings, Concord, Calif., assignor to Zeltex, Inc., a corporation of California Filed May 27, 1968, Ser. No. 732,375

Int. Cl. G06g *7/20, 7/26*

U.S. Cl. 235—197 8 Claims

ABSTRACT OF THE DISCLOSURE

An improved method and apparatus are described herein for generating a plurality of harmonic related electrical half-wave triangular functions. Such triangular functions are electronically summed for approximating a parabolic function, which is in turn utilized in an electronic analog multiplier as disclosed in my co-pending application, Ser. No. 483,180; filed Aug. 27, 1965, for Apparatus and Method for Producing Square-Law Function.

The invention relates to electronic analog multipliers of a quater-square type and more particularly to that portion of the apparatus which performs the squaring operation. An analog device as here used represents the output as the magnitude of an electrical signal.

The quarter-square type analog multiplier has as its basis of operation, the algebraic relationship:

$$xy=\tfrac{1}{4}([x+y]^2-[x-y]^2)$$

The basic scheme of the quarter-square multiplier is shown in FIG. 1 of the drawings. The principal parts of this type of multiplier are (1) an input summing, inverting and absolute value network for receiving input signals $x$ and $y$, which forms the quantities $-a|x+y|$ and $+a|x-y|$; (2) one each positive and negative square law function generators to form the quantities $b(x+y)^2$ and $-b(x-y)^2$; and (3) an output summing unit which forms the desired output $b(x+y)^2-b(x-y)^2=cxy$.

In the above mentioned application Ser. No. 483,180, a novel method and apparatus for performing the squaring operation (2) is disclosed, wherein a series of progressive frequency triangular wave function are generated and electronically summed to produce a segmental approximation to a parabolic function such as $(x-y)^2$. The present invention pertains to a new method and apparatus for generating these triangular wave functions in which each consecutive triangular wave form is derived solely from an immediately preceding lower order wave form in a serial wave shaping fashion. This operation is contrasted with that described in application Ser. No. 483,180, wherein lower order triangular functions are repeatedly added and subtracted with one another in what may be characterized as parallel wave shaping in order to generate a higher order triangular function. The existing parallel wave shaping arrangement for generating such triangular wave forms has proved quite suitable in many applications, especially those in which the operational voltages for the multiplier are on the order of 100 volts. However, it has been found that the repeated summing and subtracting operations thereof, necessitating numerodus resistive elements, attenuates accuracy of the system at lower operational voltages and limits the number of triangular functions which may be effectively generated.

Accordingly, an object of the present invention is to provide an improved active-type squaring network capable of precision low voltage operation.

A further object of the invention is to provide a method and apparatus for generating a plurality of harmonic related triangular wave functions having a segmental relationship with a parabolic function and exhibiting a high degree of accuracy over a wide voltage range and to accomplish this with reasonable economy.

Another object of the invention is to provide a method and apparatus for generating increasingly higher order harmonic triangular wave functions in a square law multiplier with heretofore unobtainable accuracy.

The invention possesses other objects and features of advantage, some of which of the foregoing will be set forth in the following description of the preferred form of the invention which is illustrated in the drawings accompanying and forming part of this specification. It is to be understood, however, that variations in the showing made by the said drawings and description may be adopted within the scope of the invention as set forth in the claims.

FIG. 1 is a schematic block diagram of a quarter square analog multiplier.

FIG. 2*a* is a graph showing one of the half-wave rectified triangular wave functions used in the present method and apparatus.

FIG. 2*b* is a graph showing another of the triangular wave functions.

FIG. 2*c* is a graph of another of the triangular wave functions.

FIG. 2*d* is a graph of another of the triangular wave functions.

FIG. 2*e* is a graph of a segmental approximation of a parabolic function derived by summating the functions shown in FIGS. 2*a*, 2*b*, 2*c*, and 2*d*.

The analog multiplier is a device in which voltages $x$ and $y$ are applied as inputs and from which a voltage $cxy$ appears as an output. Commonly these are 100 volt multipliers wherein the constant $c$ is suitably adjusted to scale the output to a desired level. However, in the instant case, due to the precison features of the present invention, input voltages in the range of 10 volts may be accurately multiplied providing for versatility of the system, e.g. low voltage applications. It is also usual for each $x$ and $y$ to vary as functions of time; and an important characteristic of the present multiplier is its ability to multiply faithfully when the $x$ and $y$ inputs change rapidly in value.

Figure 1:
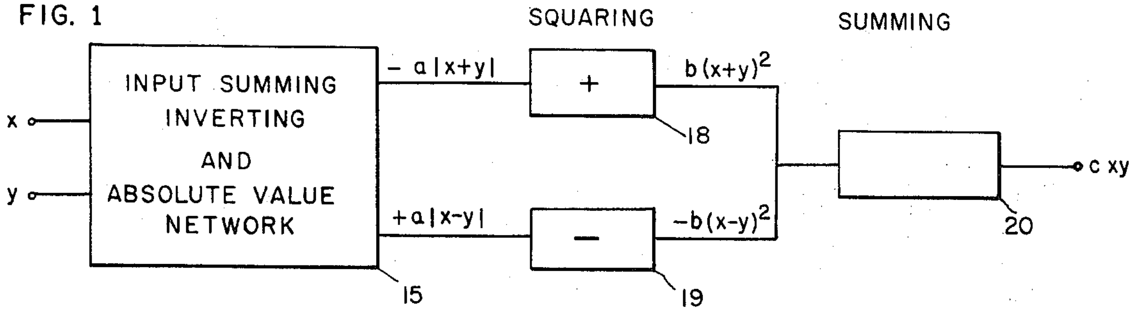

With reference to FIG. 1, the two input voltages $x$ and $y$ are applied to an input summing, inverting an absolute value network 15 which provides an output of $-a$ times the absolute value of $x+y$, or $-a\ |x+|$, and $+a$ times the absolute value of $x-y$, or $+a\ |x-y|$. These two outputs are then fed into squaring circuits 18 and 19, the ouputs from which are represented by the products $+b$ times the quantity $(x+y)^2$, or $+b(x+y)^2$, and $-b$ times the quantity $(x-y)^2$, or $-b(x-y)^2$. The latter outputs are then fed into a summing network 20, the output of which is the desired product $cxy$ in accordance with well understood algebraic addition.

The present invention is directed to the squaring networks 18 and 19, and more particularly to those portions of the networks which generate the triangular wave function series. In the quarter-square analog multiplier, the input voltages to these squaring networks are $-a\ |x+y|$ and $+a\ |x-y|$. For simplicity in the description that follows, only one squaring circuit will be described and the input signal will be identified as $x$; it being noted that the respective squaring networks 18 and 19 produce outputs of opposing polarity. In a squaring network, an input voltage is converted to an output voltage which is the square of an input voltage multiplied by an appropriate constant. Ideally the relationships start at zero so that if the input voltage is zero, the output voltage is likewise zero such that a direct reading output is attained without adjustment. If this curve were plotted, say on the face of an oscilloscope with $e_{in}$ as the abscissa and $e_{out}$ as the ordinate, the curve would appear as a parabola. In a larger sense, therefore, the function of the apparatus is to provide electronically a parabolic function. This is accomplished as described in patent application Ser. No. 483,180, by summating a plurality of symmetrical half wave rectified triangular functions (referred to above as harmonic related triangular wave functions), shown in FIG. 2 as $S_1$, $S_2$, $S_3$, and $S_4$, having a series relationship in which the successive functions have a frequency progression of $2^j$ where $j$ represents the series 0, 1, 2, 3 . . . and with the base break point of each triangular function coinciding with the peak of the next high order series function. If we let P equal the number of these triangular waves as illustrated in FIGS. 2*a*, 2*b*, 2*c*, and 2*d*, the summating of these triangular waves will produce a segmental curve as seen in FIG. 2*e* having 2*p* segments or break points. Finally, the successive peak magnitudes of the several triangular wave functions follow as relationship producing a change in slope in successive segments wherein the change in slope is a constant. The result is a segmental approximation of a parabolic function.

Figure 2A:
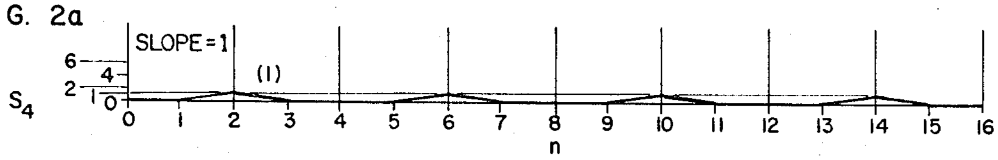
Figure 2B:
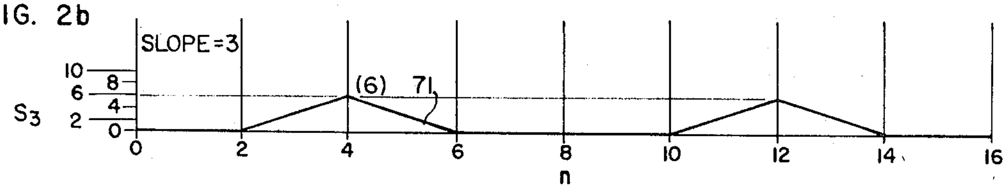
Figure 2C:
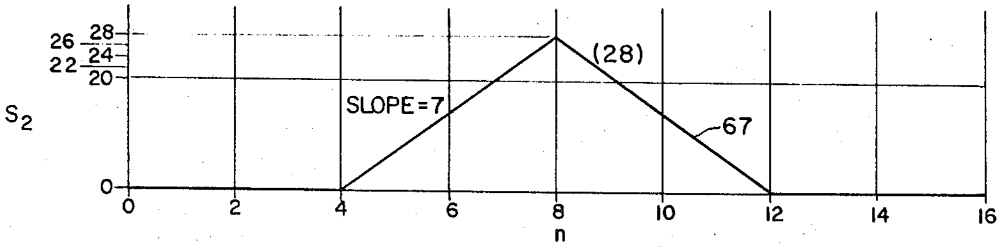
Figure 2D:
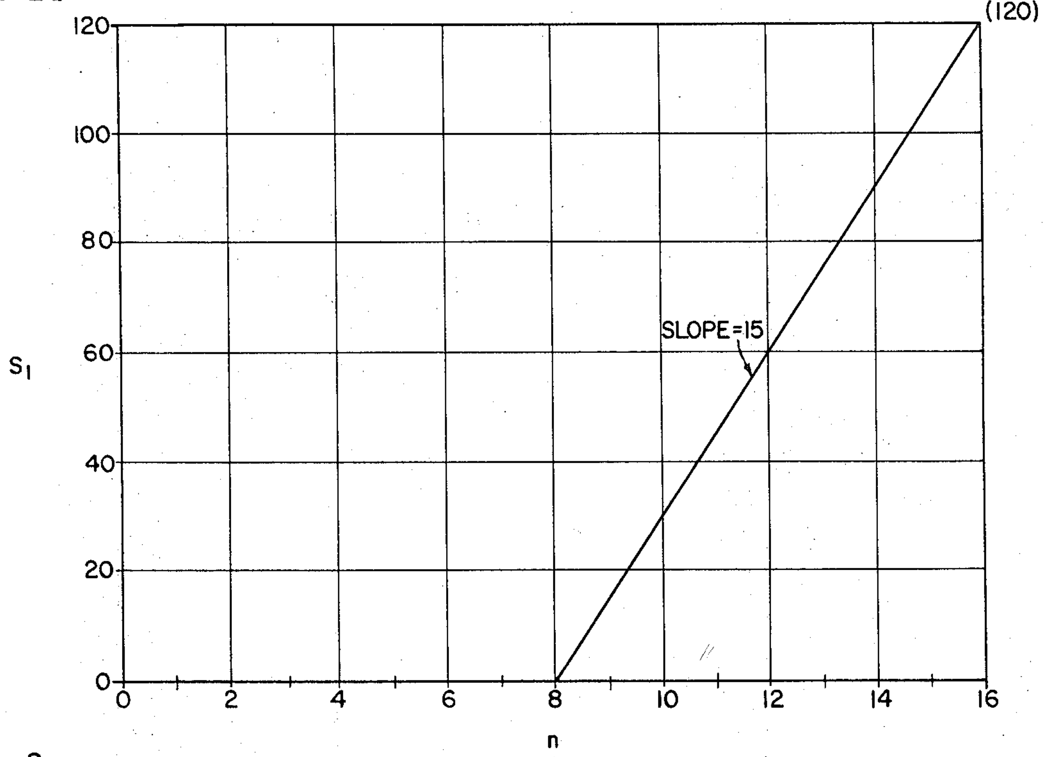
Figure 2E:
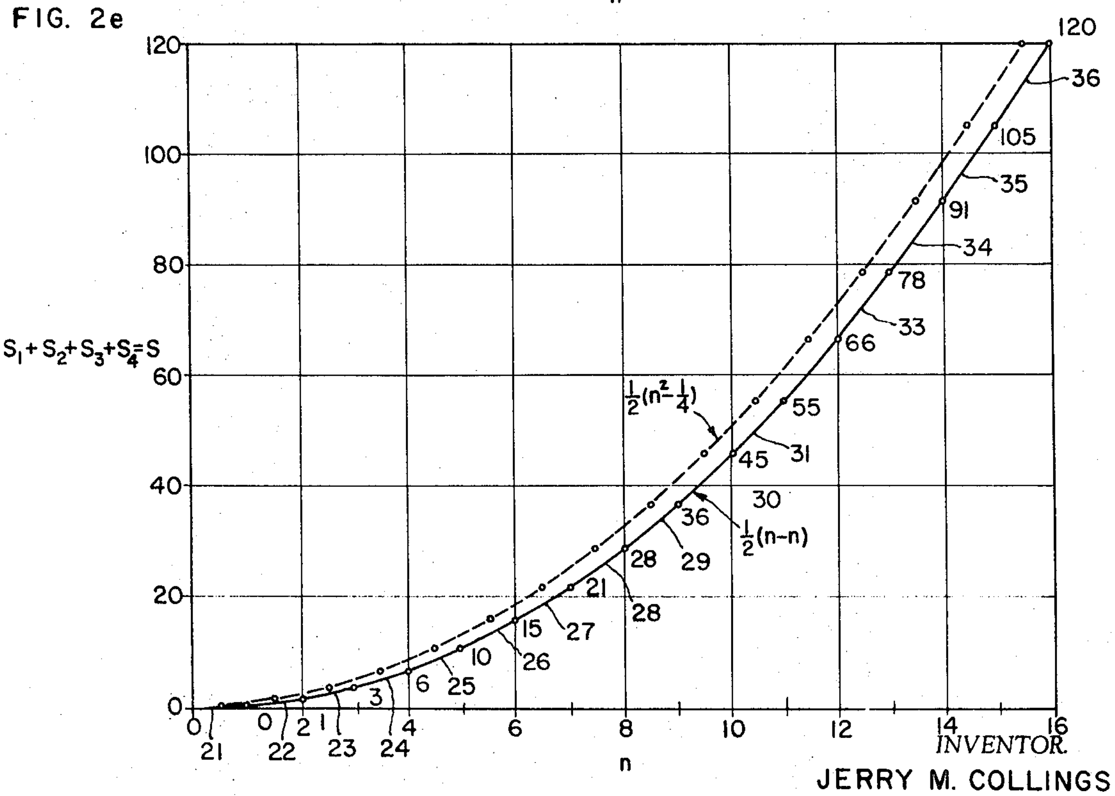

The foregoing may be seen graphically by an examination of FIGS. 2*a*, 2*b*, 2*c*, 2*d* and 2*e*. With reference to FIG. 2*a*, it will be seen that the function $S_4$ is plotted as the ordinate and $n$ as the abscissa and the latter has been subdivided for convenience into sixteen units. $S_4$ appears at $n=1$ as the beginning of an inclined ramp which extends to $n=2$ and then breaks downwardly to zero at $n=3$. In accordance with the half wave rectified portion of the definition of this function, no signal appears between $n=3$ and $n=5$. At $n=5$ the function repeats as above and similarly repeats at $n=9$ and $n=13$. In other words, if this were a full wave function, there would be a negative portion of the curve appearing between $n=3$–5, $n=7$–9 and $n=11$–13. Because of the rectification, this negative portion of the function is removed. The peak amplitude of the function $S_4$ is set for the purpose of this illustration at 1.

With reference to FIG. 2*b*, it will be seen that a similar symmetrical half wave rectified triangular wave function $S_3$ starts at zero value at $n=2$ and rises as a straight ramp to $n=4$ then extends downwardly to zero at $n=6$; and again repeats at $n=10$, with no signal appearing between $n=0$–2, $n=6$–10 and $n=14$–16. $S_3$ represents the next lower order function of the series relationship and accordingly there is a frequency progression between $S_3$ and $S_4$ of 2, that is in the present illustration $S_3$ has two half cycles and $S_4$ has four half cycles. It will also be seen that the base points, viz, $n=2$, 6, 10 and 14 of functions $S_3$ coincide with the peaks of the next higher order series function $S_4$. The peak magnitudes of function $S_3$ is set at 6.

With reference to FIG. 2*d*, it will be noted that function $S_2$ is zero from $n=0$ to $n=4$, then rises on a ramp to $n=8$ and decreases in a similar ramp to zero at $n=12$ and remains at zero for the balance of the abscissa $n=12$ to $n=16$. This function $S_2$ follows the relationship above defined in that its frequency is one-half of the next higher order function $S_3$; and its base break points 4 and 12 coincide with the peaks of $S_3$. The peak of function $S_2$ is set at 28.

With reference to FIG. 2*d*, it will be noted that function $S_1$ is zero from $n=0$ to $n=8$ then rises as a straight ramp to $n=16$. If the curve were continued, the ramp would then start down so that function $S_1$ in common with functions $S_2$, $S_3$ and $S_4$ is a symmetrical half wave rectified triangular wave function, only a portion of which is here used. It will also be observed that the frequency of $S_1$ is one-half of $S_2$ and the base break point of $S_1$, viz, $n=8$, is located at the peak of the next higher order series function $S_2$. The peak amplitude of $S_1$ is adjusted to 120.

As will be apparent from the foregoing, the slope of the successive curves $S_1$–$S_4$ decreases in the following order: 15, 7, 3 and 1. Thus viewing the slope progression in a reverse fashion, that is, reading from the higher to the lower order functions, the slope of each successive wave form increases by powers of two. The summation of functions $S_1$ plus $S_2$ plus $S_3$ puls $S_4$ appears in FIG. 2*e*. The relationship of these figures permits a graphic addition. From $n=0$ to $n=1$, all functions are zero and hence the summation shown in FIG. 2*e* as segment 21 is likewise zero. From $n=1$ to $n=2$, the only function appearing is $S_4$ which has a slope of 1. Hence the next segment 22 of the summated function $S_4$ is 1. Between $n=2$ to $n=3$, $S_4$ subtracts its slope of 1 from $S_3$ whose slope is 3 so that the next segment 23 has a slope of 2. Between $n=3$, to $n=4$ only function $S_3$ appears and accordingly the corresponding segment 24 will have a slope of 3. Between $n=4$ to $n=5$, function $S_3$ substracts from function $S_2$ so that the resulting segment 25 has a slope of $7-3=4$. From $n=5$ to $n=6$, function $S_4$ is additive so that the resulting segment 26 has a slope of $7-3+1=5$. From $n=6$ and $n=7$, function $S_4$ subtracts from function $S_2$ so that the resulting segment 27 has a slope of $7-1=6$. From $n=7$ to $n=8$, only function $S_2$ is involved so that the corresponding segment 28 will have a slope of 7. Between $n=8$ and $n=9$, function $S_2$ subtracts from function S, so that the resulting segment 29 has a slope of $15-7=8$. Between $n=9$ and $n=10$, function $S_4$ is added in so that the resulting segment 30 has slope of $15-7+1=9$. Between $n=10$ and $n=11$, function $S_4$ subtracts while function $S_3$ adds so that the slope of the resulting segment 31 is $15-7+3-1=10$. Between $n=11$ and $n=12$, function $S_4$ is at zero so that the resulting segment 32 has a slope of $15-7+3=11$. Between $n=12$ and $n=13$, function $S_3$ subtracts from function $S_1$ so that the resulting segment 33 has a slope of $15-3=12$. Between $n=13$ and $n=14$, function $S_4$ is added so that the resulting segment 34 has a slope of $15-3+1=13$. Between $n=14$ and $n=15$, function $S_4$ is subtracted from function $S_1$ so that the resulting segment 35 has a slope of $15-1=14$. Between $n=15$ and $n=16$ only function $S_1$ is involved so that the final segment 36 has a slope of 15.

The successive peaks or break points of the segments 21–36 will fall as seen in FIGS. 2*e* at 0, 1, 3, 6, 10, 15, 21, 28, 36, 45, 55, 66, 79, 91, 105, and 120.

For convenience in understanding the summation of a series of symmetrical half wave rectified triangular wave functions as above explained the analysis of each segment 21–36 is presented in the following table:

| | | Individual slopes | | | | Summated | |
|---|---|---|---|---|---|---|---|
| $n$ | Segment | $S_1=15$ | $S_2=7$ | $S_3=3$ | $S_4=1$ | Slope | Peak value |
| 0-1 | 21 | 0 | 0 | 0 | 0 | 0 | 0 |
| 1-2 | 22 | 0 | 0 | 0 | 1 | 1 | 1 |
| 2-3 | 23 | 0 | 0 | 3 | −1 | 2 | 3 |
| 3-4 | 24 | 0 | 0 | 3 | 0 | 3 | 6 |
| 4-5 | 25 | 0 | 7 | −3 | 0 | 4 | 10 |
| 5-6 | 26 | 0 | 7 | −3 | 1 | 5 | 15 |
| 6-7 | 27 | 0 | 7 | 0 | −1 | 6 | 21 |
| 7-8 | 28 | 0 | 7 | 0 | 0 | 7 | 28 |
| 8-9 | 29 | 15 | −7 | 0 | 0 | 8 | 36 |
| 9-10 | 30 | 15 | −7 | 0 | 1 | 9 | 45 |
| 10-11 | 31 | 15 | −7 | 3 | −1 | 10 | 55 |
| 11-12 | 32 | 15 | −7 | 3 | 0 | 11 | 66 |
| 12-13 | 33 | 15 | 0 | −3 | 0 | 12 | 78 |
| 13-14 | 34 | 15 | 0 | −3 | 1 | 13 | 91 |
| 14-15 | 35 | 15 | 0 | 0 | −1 | 14 | 10 |
| 15-16 | 36 | 15 | 0 | 0 | 0 | 15 | 12 |

From the foregoing, it will be apparent that the segmental approximation of a parabolic function illustrated in FIG. 2*e* follows the general formula $S=\frac{1}{2}(n^2-n)$.

The present apparatus and method accordingly may be used whenever it is desired to generate a segmental wave extension of the half wave triangular function shown in diagram 62 into a triangular wave having a pair of peaks located at the corresponding base line break points of the preceding half wave triangular function, as shown by diagram 63. The positive portions of $S_{03}$, which provide the last mentioned triangular function are fed together with inverted negative portions of $S_{03}$ provided by inverter 47 into summing input 58 along with bias signal $S_{b4}$. The summation of these signals results in $S_4$ which is converted by network $N_4$ into positive and negative isolated signal portions, wherein the positive portions of $S_{04}$ appear as a triangular function having four peaks located at the respective base line break points of the previous lower order triangular function, as shown by diagrams 64 and 63, respectively.

Each of the networks $N_1$ through $N_4$ is identical with the provision that bias signal $S_{b1}$ is selected to provide a positive one-half scale relationship with $S_{in}$ and bias signals $S_{b2}$, $S_{b3}$ and $S_{b4}$ are each selected to provide a negative one-half scale relationship with $S_{in}$. It is noted that the peak voltages for each of the output signals $+S_{01}$ through $+S_{04}$ are equal and correspond in magnitude to the peak or maximum value of the input signal $S_{in}$. In order to preserve the amplitude of the input signal at the outputs, it is necessary to introduce a gain of two in each of networks $N_1$–$N_4$, which gain counteracts the amplitude bisecting effect caused by the one-half scale bias signals, $S_{b1}$–$S_{b4}$.

As a significant feature of the present invention, it will be seen that input signal $S_{in}$ is introduced only once into the circuit rather than repetitive introduction thereof into each stage of networks $N_1$–$N_4$. Accordingly, each cascaded stage, serially connected one to the other, performs an individual wave shaping operation on input signal $S_{in}$ in serial sequence, to produce a series of harmonic related triangular wave forms. As a result of this serial arrangement, a serial path of information flow is provided through the circuit, permitting rapid tracking of the output signals $S_{01}$–$S_{04}$ with input signal $S_{in}$ without incurring intersystem time delays and phase shifting which induce output errors.

Additionally, each of the summing inputs 55 through 58 handles a minimal number of summating signals, the maximum of which is three, thereby minimizing system error which would otherwise be aggravated by numerous summing resistors. Furthermore, while additional higher order stages may be serially cascaded as shown by the dotted lines in FIG. 4, e.g. network $N_s$ and inverter 48, such additional stages regardless of the number will require only a maximum of three input signals. The significance of this feature may be better appreciated by referring to FIG. 5 wherein network $N_5$ for example, has associated therewith three input summating resistors R13, R14, and R15. According to the characteristics of operational amplifier circuits, the plurality of signals, in this instance three, may be summed by inducing current flow through each of the last mentioned resistors. Now the accuracy of the system is dependent upon the accumulated error probability of each of resistors R13–R15 wherein each resistor may introduce its own independent source of error. It is apparent that the fewer the number of input resistors in the network, the smaller the accumulated or total error will be. In the present invention, only a minimal number of such resistors are required for each stage (a maximum of three) regardless of how many additional higher order stages are serially cascaded to the circuit.

Figure 4:
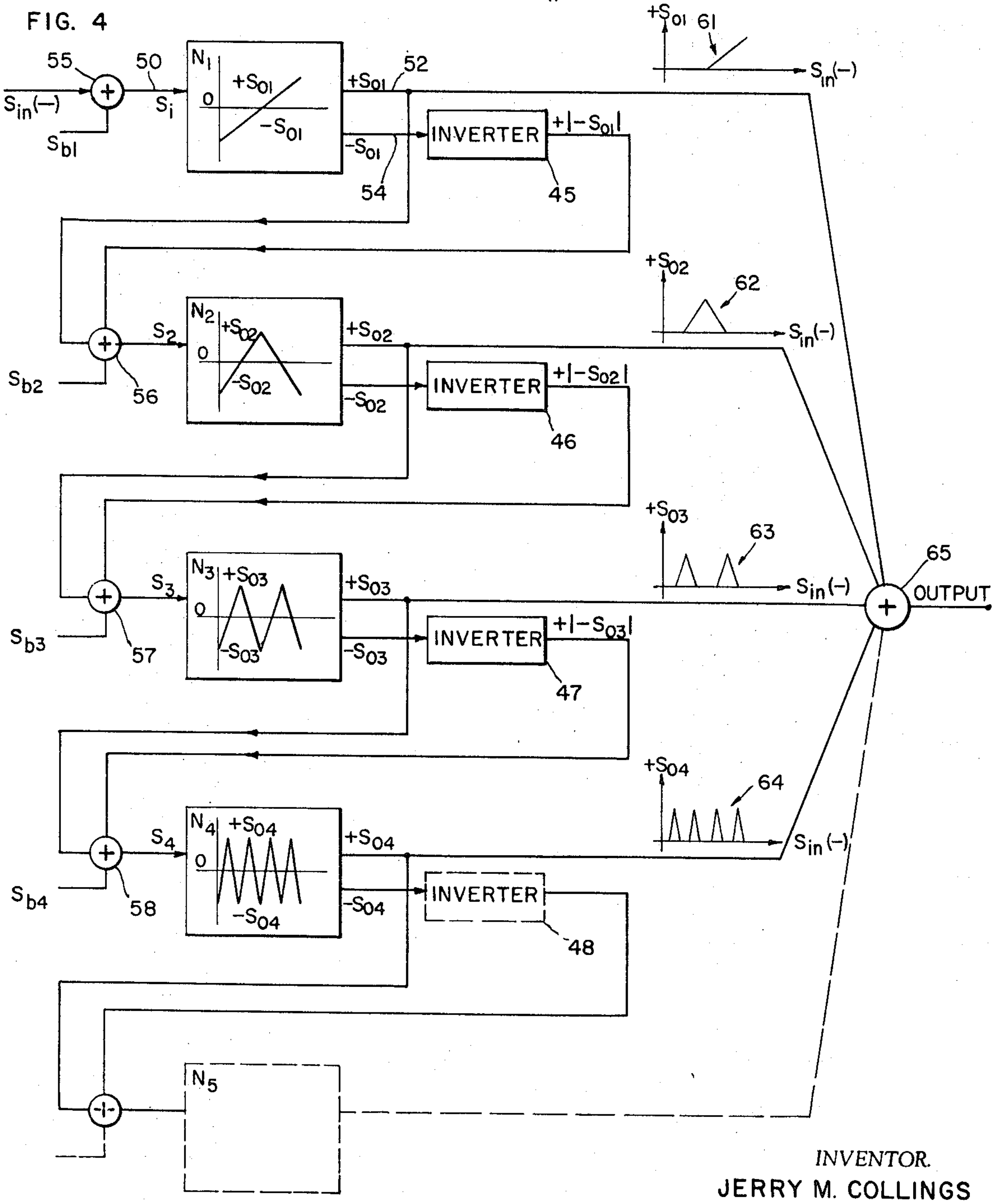
FIG. 4 is a schematic block diagram of the present invention.
Figure 5:
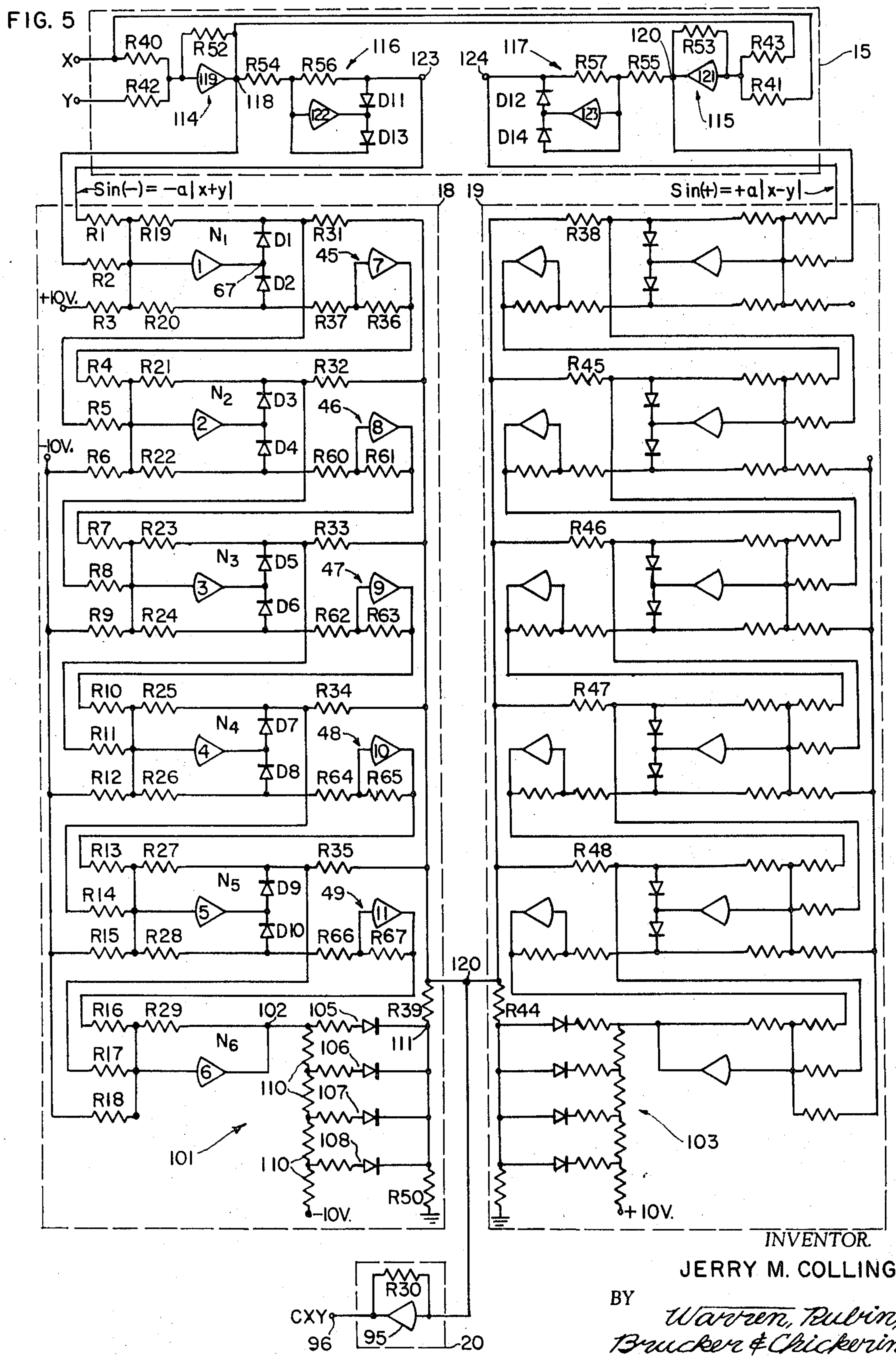
FIG. 5 is a schematic diagram of an electronic analog multiplier incorporating the triangular function generator of the present invention.

While the triangular wave outputs shown in FIG. 4 by diagram 61 through 64 are related to one another with their respective base break points progressing as 1, 2, 4 and 8, it is noted that the amplitudes thereof do not correspond to those shown in FIGS. 2*a* through 2*d* wherein the amplitudes progress as 1, 6, 28, and 120. Accordingly, it is necessary to adjust the relative amplitudes of $S_{01}$–$S_{04}$ in the present invention by differential gain summation at junction 65. This is readily accomplished in the instant invention by adjusting the relative gains of each function signal at summating junction 65. Particularly as shown in FIG. 5, resistors R31–R35 are selected with respect to feedback resistor R30 of operational amplifier 95 to provide means differentially summing the amplitudes of the several triangular functions between the output of each of networks $N_1$ through $N_5$ and output 96 of the multiplier. In FIG. 4, these last mentioned resistors and operational amplifier 95 are diagramatically illustrated by summation junction 65.

Thus the output at junction 65 provides a segmental approximation of a parabolic (square-law) function. The parabolic function is the result of generating a plurality of harmonic related triangular wave functions having the unique relationshtip therebetween as described in conjunction with FIGS. 2*a* through 2*e*. Somewhat at variance with this above described method, the highest order network, for example $N_5$ in FIG. 4, may be adjusted to provide an output characterized by a full wave or approximately full wave triangular function. This full wave output then may be converted into an error curve function and summated together with positive outputs $+S_{01}$ through $+S_{03}$ as hereinabove described. This particular feature is described in detail in application Ser. No. 483,180.

In accordance with the present invention, the several networks $N_1$, $N_2$, $N_3$ and $N_4$ shown in FIG. 4 and additional networks $N_5$, shown in FIG. 5, each comprise an electronic network centering about an operational amplifier (see operational amplifiers 1–5 in FIG. 5). An operational amplifier is a direct coupled high gain amplifier of extremely large negative gain idealized for many purposes as minus infinity. Also characteristic of the use of such an amplifier because of its infinite gain, is the large amount of feedback from output to input which normally is so large that the behavior of the circuit is described by the components feeding the amplifier and placed around it to provide the feedback. For example, with reference to amplifier 1 in FIG. 5, it will be noted that resistors R1, R2, and R3 are connected to the input of the amplifier as summating resistors while resistor R19 and serially connected diode D1 are connected in the feedback loop from the output of amplifier 1 to the input thereof. Additionally, associated with amplifier 1 is a second feedback loop consisting of resistor R20 and serially connected diode D2. Also characteristic of the operational amplifier, the input is held at the virtual ground since even a very small input voltage will drive the amplifier to saturation. Accordingly, the gain of the amplifier network is a function of the ratio the input resistors and the feedback loop impedances. If these are made equal, the gain is −1 and if the ratio is changed by say 10, the gain is −10. While the ideal operational amplifier without feedback has a gain of minus infinity, a commercial operational amplifier may have a gain of about 100,000 which for practical purposes is the equivalent of infinity. For example, in such an amplifier, a 1 millivolt input will cause a full swing 100 volt output. Since operational amplifiers are well understood in the art, further details of construction are not required to be given here and the usual block diagram as used in FIG. 5 will suffice.

Referring now to both FIGS. 4 and 5, the input signal for amplifier 1, see FIG. 5, is applied as the sum of the currents through resistors R1 and R2 wherein this signal corresponds to $S_{in}$ in FIG. 4 and in the instant example varies from zero to −10 volts. An output terminal 67 of amplifier 1 is connected respectively to the anode of diode D1 and the cathode of diode D2. The cathode of diode D1 is in turn connected to feedback resistor R19 wherein the junction therebetween corresponds to junction 52 in FIG. 4 and which presents the positive portions of signal $S_{01}$. The anode of diode D2 is connected to feedback resistor R20 wherein the junction therebetween corresponds to output 54 shown in FIG. 4, preapproximation of a parabolic function having the generalized formula of $Ax^2+Bx+C$. Where the system is used for a quarter square multiplier a further refinement is desired, viz., the elimination of the linear term B$x$ in the generalized formula or the term $n$ in the formula of the curve shown in FIG. 2*e*. One way this may be done is by shifting the base break points of the several triangular wave functions $S_1$, $S_2$, $S_3$ and $S_4$ one-half of a unit of $n$ to the left of their positions seen in FIGS. 2*a*–2*e*.

In FIGS. 2*a*–2*e*, the horizontal coordinate or abscissa is represented by the variable $n$ which in the present apparatus is the scaled input voltage. Once the number of triangular wave forms is selected and the number of segments or break points thus established, the units on $n$ may be considered as the full scale input voltage for which the system is designed, divided by the number of segments. In the illustration of FIGS. 2*a*–2*e*, four triangular wave forms are used, thus producing a segmental parabolic curve having $2^4$ power or 16 segments. It is convenient to consider $n_{max}$ to be the amount of input voltage which would correspond with the upper limit of the parabolic curve and which would be the maximum input voltage for which the system is designed.

It can be shown that by the step of shifting all of the triangular waves to the left by an amount of one-half unit, by adding a constant bias of minus one-half unit to the input signal $n$, the function becomes $S=\frac{1}{2}(n^2-\frac{1}{4})$, as illustrated in dashed lines in FIG. 2*e*.

Most importantly, in the foregoing it will be observed that the number of segments in the parabolic function, and hence the accuracy of the system, is greatly multiplied over the number of basic circuits or triangular waveforms used. Generally for $p$ rectifying circuits providing $p$ number of symmetrical half-wave rectified triangular wave functions, $2^p$ segments in the parabolic function is obtained.

As hereinabove noted, the accuracy of the square-law curve simulated by the foregoing method increases with the number of straight-line segments comprising the curve which in turn is dependent upon the number of component wave forms. Since the number of segments is equal to $2^p$ where $p$ is the number of component wave forms, the method and apparatus described herein enables the production of a curve approximating a parabola to any degree of accuracy desired.

Examination of wave functions $S_1$, $S_2$, $S_3$, and $S_4$ in FIGS. 2*a*–2*d* shows that each successive wave form provides a correction to the function approximation generated by the sum of preceding wave forms. The true correction curve at any stage of the progression is equal to the difference of the continuous square-law function and the sum of the progression of triangular wave forms. This difference is in itself a repetitive parabolic function.

As described in application Ser. No. 483,180, a satisfactory error curve may be generated by the fourth triangular wave function $S_4$. To do so, wave form $S_4$ is generated as a full-wave function as shown by solid line 42, in FIG. 3, and is fed into a passive diode network to obtain the segmental parabolic error curve shown by dotted line 41.

METHOD OF GENERATING COMPONENT TRIANGULAR WAVE FORMS

According to the present invention, the series of half wave triangular functions as shown in FIG. 2 are generated by the method and apparatus of FIG. 4 wherein each of the functions depicted by diagrams 61, 62, 63 and 64 are derived from a full wave extension of the next lower order half wave triangular function. That is, each of the full wave triangular functions illustrated within networks $N_1$, $N_2$, $N_3$ and $N_4$ present a system of positive and negative polarity signal segments which are according to the present invention rearranged by succeeding networks to produce half wave triangular functions having twice the frequency of the full wave triangular function from which it was synthesized.

The apparatus employed in the development of each of the half wave triangular functions having the above defined relationship, comprises a series of electronic amplifying, polarity inverting and isolating networks $N_1$, $N_2$, $N_3$ and $N_4$ and a plurality of polarity inverting networks, inverters 45, 46, 47 and 48. Such electronic networks are serially cascaded relative to an input signal $S_{in}$ such that each of the half wave triangular functions are produced in response to the input signal $S_{in}$ through a generally serial signal flow path provided by the serially cascaded arrangement of the networks.

As described in further detail herein, the half wave triangular function as shown in diagrams 61–64 are summed at summing junction 65, shown in FIG. 4. Such summation produces an output having in general a parabolic relationship with inpt signal $S_{in}$ and more particularly an output representing the square of a quantity preassigned to the magnitude of signal $S_{in}$.

Network $N_1$, for example, includes an input 50 and a pair of opposing polarity isolated outputs 52 and 54 wherein the network has the following operational characteristics: If input $S_1$ is greater than zero, then output 54 will equal $-kS_1$, in this instance $-S_{01}$ and output 52 will be zero; when input 50, $S_2$, is less than zero output 52 will equal $+kS_2$, in this instance $+S_{01}$; and output 54 will equal zero. Networks $N_1$–$N_4$ comprise an operational amplifier having a pair of feedback paths each path including a serially connected diode and resistor as best shown in FIG. 5, and to be discussed more fully hereinafter. Polarity inverters 45–48 comprise an operational amplifier having a resistive feedback path as shown in FIG. 5 by corresponding reference numerals.

In FIG. 4, output 52 of network $N_1$ is connected to a summing input 56 of network $N_2$ and each of the positive outputs of networks $N_2$ and $N_3$ corresponding to the positive output 52 of $N_1$ are similarly fed to respective summing input 57 and 58 of successive networks $N_3$ and $N_4$. Inverters 45, 46, and 47 provide polarity inversion of the negative output portions of networks $N_1$, $N_2$ and $N_3$ and issue such inverted portions individually to the summating input of an adjacent higher order stage.

In operation of the circuit shown in FIG. 4, a signal $S_{in}$, which would correspond to $-a|x+y|$ in FIG. 1, is introduced into summating junction 55 along with a bias signal, $S_{b1}$. $S_{in}$, which in this instance is negative, may for example vary from zero to $-10$ volts in which case $S_{b1}$ is selected to provide a positive half scale bias voltage, or plus 5 volts. Thus produced at input 50 is a signal, $S_1$, which varies from $+5$ volts to $-5$ volts and is representative of a full wave triangular function. $S_1$ is then operated on by network $N_1$ which inverts, amplifies (a gain of 2 in this case) and isolates positive and negative signal portions, producing at output 54 a negative output signal segment $-S_{01}$ which ranges from $-10$ to zero volts and at output 52 a positive output signal segment, $+S_{01}$, which ranges from zero to 10 volts. Accordingly, the output signal, $S_{01}$ is zero for increasing negative values of $S_{in}$ until the bias voltage, $S_{b1}$ is overcome where at $S_{01}$ increases with a positive slope as shown.

The second stage of the apparatus shown in FIG. 4 receives the outputs, $+S_{01}$ (the positive segments of $S_{01}$) and $+|-S_{01}|$ which represents the inverted negative portions of $S_{01}$, at summing junction 56 together with bias signal $S_b{}^2$. Upon summation of these signals, signal $S_2$ representative thereof and in the form of a full wave triangular function, is operated on by network $N_2$ which as in the case of $N_1$ inverts, amplifies, and isolates the positive and negative segment portions of output signal $S_{02}$. The positive portions of $S_{02}$, $+S_{02}$, synthesize the half wave triangular function shown by diagram 62. The negative portions of $S_{02}$, $-S_{02}$ are introduced into inverter 46 producing positive inverted segments of $-S_{02}$ represented by $+|-S_{02}|$. Now, $-S_{02}$ and $+|-S_{02}|$ are summed at input 57 together with bias signal $S_{b3}$, such summation producing $S_{03}$. At this stage, network $N_3$ converts the full senting the negative signal portions of $S_{01}$. Thus, the network shown in FIG. 5 including amplifier 1, resistors R19 and R20 together with diodes D1 and D2 provide the inverting-amplifying-polarity isolating network $N_1$ as shown both in FIG. 4 and FIG. 5.

Since networks $N_1$, $N_2$, $N_3$, $N_4$, and $N_5$ operate in essentially the same manner, only the mechanism of network $N_1$ will be described in detail. Operational amplifier 1 and its associated network exhibits a first feedback conducting mode through R19 and diode D1 and a second feedback conducting mode through resistor R20 and diode D2. More specifically, due to the opposing polarity orientation of diodes D1 and D2, the serial path through R19 and D1 will conduct only when the output of amplifier 1 appearing at output 67 is positive with respect to the input of the amplifier. On the other hand, serially connected resistor R20 and diode D2 will provide a conductive feedback path only when output 67 is negative with respect to the input of amplifier 1. Accordingly, the voltage appearing at the junction between R19 and D1 is proportional to the input of the amplifier so long as the output thereof is greater than zero, otherwise the voltage at the junction of R19 and D1 will remain zero. Correspondingly, the voltage at the junction between R20 and D2 is proportional to the input to the amplifier for output voltages less than zero at output 67 and for outputs greater than zero the voltage at the same junction is zero. Referring to FIG. 4, it will be apparent that network $N_1$ as shown in FIG. 5 provides for isolating the opposing polar portions of signal $S_{01}$ wherein $S_{01}$ appears at the output of network $N_1$.

In FIG. 5, inverters 45 through 47 correspond to the units with like reference numerals shown in FIG. 4. By way of example, inverter 45 includes an operational amplifier 7 having a feedback resistor R36 and an input resistor R37 wherein these resistors are selected to provide equal resistive values such that a negative unity gain is achieved from the anode of diode D2 to input resistor R4 of the next higher order stage.

The junction between R19 and D1 connected to an input resistor R5 of the network $N_2$ provides together with the input associated with resistor R4 and a bias signal applied through resistor R6, a summation of the positive portions of signal $S_{01}$ and the polarity inverted negative portions also of signal $S_{01}$. The sum of these signals is fed into the input of the amplifier of network $N_2$, wherein an inverting-amplifying-polarity isolating operation is performed principally as discussed in relation to $N_1$. Accordingly, networks $N_2$, $N_3$, $N_4$ and $N_5$ including summing resistors R7–R15, feedback components composed of resistors R21–R28 and diodes D3–D10 and operational amplifiers 2–5, together with inverters 46, 47, 48, and 49 including resistors R60–R67 and operational amplifiers 8–11, provide for further serial transformation of the initial input signal, $S_{in}$. Such operation produces at the positive polarity outputs of $N_1$ through $N_5$ a series of half wave triangular wave functions having the above described frequency progression and base break point to peak amplitude relationship.

Accordingly, when the input signals $S_{in}$ appearing as the summation of currents through resistors R1 and R2 varies from zero to −10 in the instant example, the output of network $N_1$ at the cathode of diode D1 remains at zero until −5 volts is reached whereupon a positive ½ scale bias provided by resistor R3 and the +10 volts connected thereto is overcome. At this point the cathode of diode D1 increases linearly to a maximum of +5 volts. This positive partial triangular wave form corresponds to the signal $S_1$ shown in FIG. 2B and the signal $S_{01}$ shown in diagram 61 of FIG. 4. By selecting resistors R1 and R2 with respect to resistors R19 and R20, the gain at this portion of network $N_1$ is maintained at −2 thus defining the slope of the output appearing at the cathode of diode D1 as −2 with respect to the input signal $S_{in}$. Furthermore, in order to achieve the ½ scale bias or +5 volts in this instance resistor R3 is selected to be twice the magnitude of resistors R1 and R2. The output signal appearing at the anode of diode D2 corresponding to output 54 in FIG. 4 increases from −5 volts to zero in response to the input signal $S_{in}$ decreasing from zero to −10 volts. Upon polarity inversion by inverter 45, the output of $N_1$ at the anode of diode D2 varies from +5 volts to zero and is fed into network $N_2$ through R4 together with the positive wave output of network $N_1$.

The sum of these signals provides the input signal to amplifier 2 of network $N_2$ which is biased to ½ scale or in our example a negative 5 volts. After biasing, the signal input to $N_2$ is inverted, amplified and segregated into its positive and negative portions. The resulting wave form of the output of $N_2$ appearing at the cathode of diode D4 is shown by diagram 62 of FIG. 4.

Similarly, inverter 46 together with network $N_3$ generates a triangular wave function as shown by diagram 63 in FIG. 4; inverter 47 and network $N_4$ produce a triangular wave function as shown in diagram 64 of FIG. 4; and inverter 48 together with network $N_5$ generates a triangular wave function at the junction of resistor R27 and diode D3 having twice the frequency of that shown by diagram 64. It is noted that each of the outputs of networks $N_1$ through $N_5$ produced positive half wave triangular functions of the type hereinabove described wherein the base breakpoints of preceding lower order functions correspond to the peak values of preceding higher order triangular wave functions.

The first four triangular wave functions presented by networks $N_1$, $N_2$, $N_3$ and $N_4$ correspond in many respects to the triangular functions shown by FIGS. 2*a* through 2*d*. However, it is noted that the peak magnitudes of the triangular waves shown in FIG. 4 and those generated by the apparatus detailed in FIG. 5 are generally equal, at variance with the progressive magnitudes of the waves described in conjunction with FIGS. 2*a* through 2*d*. Accordingly, it is necessary to introduce some relative gain or attenuation of these outputs from networks $N_1$ through $N_5$ in FIG. 5. This requirement is achieved by summing resistors R31, R32, R33, R34, and R35 together with operational amplifier 95 and feedback resistor R30. By selecting these summing resistors to provide progressively increasing resistances with respect to resistor R30 the peak magnitudes for each of the triangular wave series, orders 1 through 5, may be summed into amplifier 95 according to the decreasing peak amplitude progression defined by the above noted relationship.

Up to this point in the discussion of the generation of the triangular wave forms particularly those shown in FIG. 4 and the apparatus described in conjunction with FIG. 5 for the generation thereof, the disclosure has been concerned with the generation of the general parabolic curve $f(n)=\frac{1}{2}(n^2-n)$ while the actual quarter square-law function $F(n+\frac{1}{2})=\frac{1}{2}(n^2-\frac{1}{4})$ has been disregarded. Since the latter function provides for convenient cancellation of all the non-hybrid parameters when the quantities $-b(x+y)^2$ and $+b(x-)^2$ are algebraically added, it is desired for advantageous operation of the multiplier to generate the quarter square law function rather than the former general parabolic curve. This may be accomplished in several ways, one of which is to merely shift each of the triangular wave functions generated by networks $N_1$ through $N_5$ a half unit to the left by adjusting the bias signals associated with each one of these networks. On the other hand, due to the particularly unique method and apparatus for generating the triangular functions in the instant invention the general parabolic curve may be readily converted to the square law function in a different manner. This is achieved by initially selecting summing resistor R31 of the positive portion of the square law generator and likewise selecting summing resistor R38 of the negative portion of the generator to provide an absolute gain between the inputs $x$ and $y$ and the output appearing at output 96. This absolute gain is such that the first order triangular function ($S_1$ in FIG. 2$d$) corresponds to the first order approximation of the quarter square law function $f(n)=\frac{1}{2}(n^2-\frac{1}{4})$. When this is accomplished the remaining summing resistors R32, R33, R34, R35 for the positive portion of the circuit and resistors R45, R46, R47, R48 for the negative circuit portion, are then selected relative to resistors R31 and R38 to provide the desired decreasing amplitude progression.

PASSIVE DIODE ERROR CORRECTION

Figure 3:
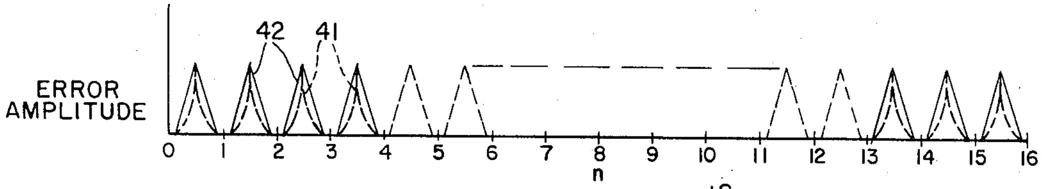
FIG. 3 is a graph of an error function utilized in the present invention for approximating high order triangular wave functions.

The error correction curve, FIG. 3, is generated by a conventional function generator of the passive diode network type, represented by resistive diode network 101 for the positive squaring portion of the multiplier and resistive diode network 103 for the negative portion as shown in FIG. 5. With reference to FIG. 5, it is noted that the output of a summing and inverting network $N_6$ is applied to the input terminal 102, of passive resistive diode network 101 including sections 105, 106, 107 and 108, each consisting of a serially connected resistor and a diode as illustrated. These sections are connected at spaced voltage points to a resistive voltage divider 110 connected at one end to input terminal 102 and at its other end to a reference voltage as for example $-10$ volts in the instant case. The several sections 105–108 are connected to a common output terminal 111 which is in turn connected to a summing resistor R39 and a reference resistor R50.

Referring now to FIG. 3, a segmental error curve 41 is shown which is the result of the non-linear response by diode network 101 to the application of essentially full wave triangular wave form 42. The wave form 42 is derived from network $N_6$ which is responsive to the summation of the positive triangular wave form produced at the junction of R27 and diode D9 of network $N_5$ and the inverted negative portions of the output of the same network provided by inverter 49. These signals are summed by resistors R16 and R17 connected to the input of amplifier 6 of network $N_6$. It is noted that in network $N_6$ the diodes are absent in the output and feedback circuit thereof. This arrangement provides together with a preselected bias signal applied through resistor R18, an essentially full wave triangular wave function having twice the frequency or twice the components of the half wave triangular wave form generated by network $N_5$ at the cathode of diode D3. The passive diode network 101 connected to summing junction 120 through resistor 39 and corresponding diode network 103 connected to junction 120 by resistor R44 in the present case provides a four-section segmental approximation of a parabolic function and thus serves to add two additional stages of the type of networks $N_1$ through $N_5$ with their associated inverters 45 through 48. The result of the incorporation of this passive diode network is the provision of a segmental approximation of parabolic function having 128 sections thus to a very large degree accurately reproducing the parabolic function due to the exceedingly fine granular structure of the wave form.

DESCRIPTION OF OVERALL APPARATUS

The overall schematic diagram of the quarter-square electronic analog multiplier is illustrated in FIG. 5. The primary input circuit 15 which provides the input summing, inverting and absolute values $-a|x+y|$ and $+a|x-y|$ requires only a single phase introduction of each $x$ and $y$ input. In order to provide both the absolute value of $x+y$ and the absolute value of $x-y$, a pair of precision absolute value circuits are employed consisting of inverters 114 and 115 having the outputs 118 and 120 thereof connected to the inputs of absolute value networks 116 and 117, one each for both $x+y$ and $x-y$. Inverters 114 and 115 consist of operational amplifiers 119 and 121, each having a feedback resistor R52 and R53 respectively connected across the amplifiers. Absolute value networks 116 and 117 include respectively input resistors R54 and R55; feedback components consisting of resistors R56 and R57 serially connected to diodes D11 and D12, and diodes D13 and D14; and operational amplifiers 122 and 123. Input signal $x$ is connected to both inverter 114 through summary resistor R40 and to inverter 115 through summing resistor R41 while the $y$ input signal is connected solely to inverter 114 through summing resistor R42.

In operation, inverter 114 provides at output 118 thereof a signal proportional to minus the quantity $x+y$, which signal is fed into network $N_1$ through resistor R2 and also to inverter 115 through summing resistor R43. Also responsive to the output of inverter 114 is absolute value network 116 having an output 123 and a gain of $-1$ for voltages at output 118 greater than zero and a gain of zero for voltags at output 118 less than zero. The summation of output 123 of absolute value circuit 116 with output 118 of inverter 114 by resistors R1 and R2, wherein R1 is selected to be one-half the value of R2, provides at the input to amplifier 1 a signal proportional to the negative absolute value of the quantity $x+y$.

Similarly, inverter 115 with output 120 together with absolute value circuit 117 with output 124 produce a signal proportional to the plus absolute value quantity of $x-y$ for introduction into the negative squaring network 19.

The square-law functions corresponding to the outputs $+b(x+y)^2$ and $-b(x-y)^2$ from squaring network 18 and 19 shown in FIG. 1 are summed at junction 120 in FIG. 5. The output appearing at output 96 of operational amplifier 95 is accordingly proportional to the summation of signals at junction 120 and equal to the desired quantity $cxy$.

Summarizing the operation of the active squaring network stage, the quantity $b(x+y)^2$ is generated in response to the quantity $-a|x+y|$ through the interim generation of a plurality ($p$) triangular wave functions provided by the serially cascaded networks $N_1$ through $N_5$ together with inverters 45 through 48 of squaring network 18. Similarly, the quantity $-b(x-y)^2$ is generated in response to $+a|x-y|$ by summating the series triangular wave functions produced by the corresponding serially cascade networks of squaring network 19.

I claim:

1. In apparatus generating an output signal of parabolic relationship to an input signal which is characterized by means transforming the input signal into a series of frequency progressive triangular wave functions to provide the output signal, the combination comprising:

- a plurality of serially connected electronic waveshaping networks defining a serial signal path for receiving the input signal, said networks operative to successively shape the input signal traversing said path providing one of the triangular functions at each junction between adjacent networks, said networks each comprising:
  - a polarity inverting-polarity isolating device having an input and first and second polarity outputs, said first output of each device being connected to said input of an immediately succeeding device to provide the several junctions, and
  - a polarity inverting means connecting said second output to said input of an immediately succeeding device.

2. In apparatus squaring a quantity represented by an input signal characterized by electronic means responsive to the input signal generating a plurality ($p$) of successive half-wave triangular functions having a frequency progression of $2^j$ and having the base break points of each function coinciding with the peaks of the next higher order series function and means differentially summing the amplitudes of the functions to provide an output signal approximately representing the square of the quantity, wherein the improvement resides in the electronic means comprising:

a plurality ($p$) of amplifying-polarity inverting-polarity isolating networks having a summing input and first and second opposing polarity electrically isolated outputs, said networks being serially cascaded with each of said first outputs being individually connected to said summing inputs of the next successive said network;

biasing means connected to each of said summing inputs applying a preselected electrical bias thereto; and a plurality ($p-1$) of polarity invertors individually connected between said second outputs and summing inputs of each adjacent pair of said networks, whereby each of said networks provides at said first output one of the half-wave triangular functions in response to receipt of the input signal at said summing input of a first of said cascaded networks.

3. In the apparatus defined in claim 2, at least one of said networks comprising: an operational amplifier having an input and an output, first and second opposingly poled unidirectional feedback means connected between said amplifier input and output providing said first and second opposing polarity outputs of said network, and a plurality of summing resistors having first ends thereof jointly connected to said amplifier input and second ends individually connected to said biasing means and said polarity inverter and said first ouput of a preceding said network.

4. In the apparatus defined in claim 3, wherein said first and second feedback means each comprises: a serially connected diode and resistor, said serially connected diode and resistor for each said feedback means being connected between said amplifier input and output with said diodes being adjacent said amplifier output and positioned in polar opposition to one another to provide said first and second opposing polarity outputs of said network at the separate junctions between said resistors and diodes.

5. In the apparatus defined in claim 2, wherein said polarity inverters each comprise: an operational amplifier having an input and output, a feedback resistor connected between said amplifier input and output and an input resistor connected at one end thereof to said amplifier input, the remaining end of said input resistor being connected to said first polarity output of one of said networks and said amplifier output being connected to said summing input of the next successive network to provide polarity inversion therebetween.

6. In a method of converting an input signal into a segmental output function having an approximate parabolic relationship therewith, characterized by transforming the input signal into a plurality ($p$) of symmetrical half wave triangular functions having a frequency progression of $2^j$ and having the base break points of each function coinciding with the peaks of the next higher order function and differentially summing the resulting triangular functions according to a decreasing peak amplitude progression, the improvement in the step of transforming the input signal comprising, in sequence the operations of:

biasing the input signal to provide a symmetrical full wave signal having first and second polarity signal segments;

inverting the polarity of said signal segments;

electrically isolating said first and second signal segments to provide a first polarity half wave function and a second polarity half wave function;

further inverting the polarity of said second polarity half wave function;

summing said half wave functions to provide a compound first polarity signal;

and repeating said biasing, inverting, and isolating operations ($p$) times and said further inverting and summing operations in sequence therewith ($p-1$) times, each time substituting the resulting said compound first polarity signal for the input signal, whereby said first polarity half-wave functions provide the plurality ($p$) of symmetrical half-wave triangular functions.

7. In the method defined in claim 6, further comprising the operation of: amplifying said signal segments simultaneously with said first named inverting operation to provide said first polarity half-wave functions with equal peak amplitudes, whereby said half-wave triangular functions may be conveniently differentially summed to provide the decreasing amplitude progression.

8. An apparatus as defined in claim 1, a summing junction connected to said first outputs, and said networks providing amplification for scaling said triangular functions at said summing junction.

References Cited

UNITED STATES PATENTS

| | | | |
|---|---|---|---|
| 3,100,839 | 8/1963 | Nathan et al. | 235—197 |
| 3,102,951 | 9/1963 | Nathan | 235—197 |
| 3,120,605 | 2/1964 | Nathan et al | 235—197 |
| 3,191,017 | 6/1965 | Miura et al. | 235—194 |
| 3,426,186 | 2/1969 | Takemura | 235—197 |
| 3,443,082 | 5/1969 | Abe | 235—197 |

EUGENE G. BOTZ, Primary Examiner

J. F. RUGGIERO, Assistant Examiner

U.S. Cl. X.R.

328—144

UNITED STATES PATENT OFFICE
CERTIFICATE OF CORRECTION

Patent No. 3,543,288 Dated November 24, 1970

Inventor(s) Jerry M. Collings

It is certified that error appears in the above-identified patent and that said Letters Patent are hereby corrected as shown below:

Column 3, line 24, change "2p" to $--2^p--$.

Column 3, line 26, change "as" to --a--.

Column 3, line 62, change "2d" to --2c--.

Column 4, line 13, change "puls" to --plus--.

Column 4, in the chart, line 68, under Peak Value headi change "10" to --105--.

Column 4, in the chart, line 69, under Peak Value headi change "12" to --120--.

Column 6, line 64, change "$S_b^2$" to $--S_{b2}--$.

Column 10, line 60, change "$+b(x-)^2$" to $--+b(x-y)^2--$.

Column 12, line 8, change "summary" to --summing--.

SIGNED AND SEALED MAR 9 1971

(SEAL)
Attest:

Edward M. Fletcher, Jr.
Attesting Officer

WILLIAM E. SCHUYLER, JR
Commissioner of Patents